United States Patent [19]
Argiles Felip

[11] Patent Number: 5,928,697
[45] Date of Patent: Jul. 27, 1999

[54] PURIFICATION OF ROASTER GASES

[75] Inventor: Domingo Argiles Felip, Gerona, Spain

[73] Assignee: Nestec S.A., Vevey, Switzerland

[21] Appl. No.: 08/945,844

[22] PCT Filed: May 8, 1996

[86] PCT No.: PCT/EP96/01903

§ 371 Date: Feb. 21, 1998

§ 102(e) Date: Feb. 21, 1998

[87] PCT Pub. No.: WO96/35335

PCT Pub. Date: Nov. 14, 1996

[30]    Foreign Application Priority Data

May 8, 1995   [ES]   Spain .................................... 9500875

[51] Int. Cl.$^6$ ..................................................... A23B 4/00
[52] U.S. Cl. ........................... 426/466; 99/474; 422/182; 422/183; 426/469
[58] Field of Search ..................................... 426/466, 467, 426/469, 472; 99/467, 474, 483; 422/182, 183; 432/106, 14

[56]            References Cited

U.S. PATENT DOCUMENTS

| 3,841,826 | 10/1974 | Angstadt et al. ............................ 432/2 |
| 5,378,060 | 1/1995 | Brock et al. ............................. 432/106 |

FOREIGN PATENT DOCUMENTS

| 0 098 387 A1 | 1/1984 | European Pat. Off. . |
| 2 150 825 | 4/1973 | France . |
| 22 07 803 | 8/1973 | Germany . |
| 23 54 780 | 5/1975 | Germany . |
| 1141550 | 6/1989 | Japan . |

OTHER PUBLICATIONS

Derwent WPI Acc No 73–15959U/197312, English language abstract of France 2 150 825.
Derwent WPI Acc No 73–50738U/197336, English language abstract of Germany 22 07 803.
Derwent WPI Acc No 75–32675W/197520, English language abstract of Germany 23 54 780.
Patent Abstracts of Japan, vol. 13, No. 399 (C–632), Sep. 5, 1989 & JP,A,01 141550 (Kondo Unyu Kiko), Jun. 2, 1989.
Probat Werke, Sep. 1994, "The new PROBAT Batch Roaster, Type RT".
Tea and Coffee Trade Journal, vol. 167, No. 2, Feb. 1995.

*Primary Examiner*—George Yeung
*Attorney, Agent, or Firm*—Pennie & Edmonds LLP

[57]            ABSTRACT

A process for operating a coffee roaster to obtain reduced levels of pollutants in exhaust gases vented from the coffee roaster. In the process, fuel gases are combusted in a combustion chamber and all of the combusted gases are directed into a roasting chamber for roasting coffee beans in the roasting chamber. The exhaust gases from the roasting chamber are then separated into a recycle stream and an exhaust stream with the recycle stream comprising the majority of the exhaust gases. The recycle stream is returned to the combustion chamber. The exhaust stream is then subjected to secondary combustion at relatively low temperatures prior to venting.

10 Claims, 1 Drawing Sheet

PURIFICATION OF ROASTER GASES

TECHNICAL FIELD

This invention relates to a process for operating a coffee roaster and treating the exhaust gases from the coffee roaster so as to reduce pollutants in the exhaust gases ultimately discharged to the atmosphere. In particular, the pollutants in the exhaust gases are reduced sufficiently to meet legislation concerning pollutants in exhaust gases.

BACKGROUND OF THE INVENTION

Usually environmental legislation in developed countries sets maximum levels for one or more of the following pollutants in exhaust gases: solid particle levels, CO, NOx, and volatile organic substances. Also, limits on the temperature of the gases in exhaust chimneys and opacity of the gases are often specified in environmental legislation. However legislation in the various countries is not uniform and the permitted levels of pollutants vary from country to country.

Basically, two types of legislation can be distinguished: those which limit the NOx content of the exhaust gases, and those which do not. Spain is an example of a country in which the NOx content of the exhaust gases is restricted. For example, in Spain, exhaust gases from coffee roasters may contain a maximum: solids particle content of 150 mg/N m$^3$, CO content of 500 ppm, NOx content of 300 ppm, and an opacity level of 2. However there is no limit on the total organic carbon (TOC) that the exhaust gases may contain. Germany, however, is an example of a country in which the NOx content of the exhaust gases is not restricted. For example, in Germany, exhaust gases from coffee roasters may contain a maximum: solids particle content of 150 mg/N m$^3$, CO content of 50 mg/N m$^3$, TOC content of 50 mg/N m$^3$. However there is no limit on the NOx content of the exhaust gases.

Traditionally coffee roasters comprise a fuel burner (the fuel usually being natural gas or oil) which receives and heats air introduced from the ambient. The heated air, mixed with the combusted gas, is usually at a temperature of about 370 to 450° C. and is directed to a roasting chamber, usually in the form of a rotary cylinder or tumbler, which contains the green coffee beans. The heated air and combusted gases then roast the coffee beans. The exhaust gases from the roasting chamber are usually at a temperature of about 150° C. They are usually directed to a cyclone separator to remove entrained solid particles and are then vented; often without treatment. With this basic system, the pollutant levels in the exhaust gases will very often exceed the levels set in the relevant legislation.

Consequently, numerous systems have been proposed to reduce and control the levels of pollutants in the exhaust gases. One proposal is to direct only a part of the mixture of hot air and combusted gases from the combustion chamber into the roasting chamber; the remainder being directed to a cyclone separator and then vented. The portion of the hot air and combusted gases which is directed to the roasting chamber is passed through a cyclone separator once leaving the roasting chamber and recycled to the combustion chamber. However, upon termination of roasting by quenching with water, large amounts of steam are produced. This causes a large increase in the volume of exhaust gases, which increases the pressure and volume of the exhaust gases within the recycle circuit. This in turn can cause chilling of the flame of the burner, with the result that the quality of the combusted gases deteriorates. Also, the pollutant levels in the exhaust gases which are vented are high.

To reduce the pollutant levels in the exhaust gases which are vented, it has been suggested to include a secondary burner into the system prior to venting. Although this does reduce pollutant levels to some extent, the levels are still high. Also, the temperature in the secondary burner needs to be very high, for example above about 700° C., to obtain significant reduction in pollutant levels. Even then CO levels are usually not reduced enough. Also energy consumption is high.

It has also been suggested to include a catalytic converter into the system prior to venting of the exhaust gases. The use of a catalytic converter is the most appropriate solution in countries where the legislation does not place any limit on NOx content since the use of catalytic converters results in production of NOx. Hence, although the catalytic converter reduces CO levels, it actually increases NOx levels. However, it is difficult to introduce a catalytic converter into the system after the secondary burner due to the high temperature of operation of the secondary burner.

SUMMARY OF THE INVENTION

It is therefore an object of the invention to provide a process of operating a coffee roaster which results in exhaust gases with levels of pollutants lower than those prescribed in existing legislation.

Accordingly, in one aspect this invention provides a process for operating a coffee roaster to obtain reduced levels of pollutants in exhaust gases vented from the coffee roaster, the process comprising:

combusting gases in a combustion chamber and directing all of the combusted gases into a roasting chamber for roasting of coffee beans in the roasting chamber;

extracting exhaust gases from the roasting chamber and separating the exhaust gases into a recycle stream and an exhaust stream, the recycle stream comprising the majority of the exhaust gases and being returned to the combustion chamber; and subjecting the exhaust stream to secondary combustion prior to venting the exhaust stream.

Surprisingly, by splitting the exhaust gases from the roasting chamber and separating the exhaust gases into a recycle stream and an exhaust stream, the level of pollutants in the exhaust gases ultimately vented to the atmosphere may be reduced significantly. Further the temperature at which the secondary combustion takes place may be much lower than required in conventional systems. This enables venting of the exhaust gases at much lower temperatures. Also, incorporation of catalytic treatment is greatly facilitated.

Further, because all of the combusted gases from the combustion chamber are directed to the roasting chamber, all the energy provided in the combustion chamber is used for roasting of the coffee beans.

The recycle stream preferably comprises about 60% to about 80% by volume of the exhaust gases extracted from roasting chamber; more preferably about 65% to about 75%.

Preferably, upon termination of the roasting by quenching of the coffee beans, the recycle stream is closed and all exhaust gases extracted from the roasting chamber are directed to the exhaust stream.

Preferably the process further comprises the step of removing entrained solid particles from the exhaust gases extracted from the roasting chamber prior to splitting of the exhaust gases into the recycle and exhaust streams.

The secondary combustion preferably takes place at a temperature in the range of about 200° C. to about 350° C.

The process may further comprise subjecting the exhaust gases in the exhaust stream to catalytic treatment to reduce CO levels.

The process may be controlled automatically by means of a control system which determines and regulates the volume flow rates in the recycle stream and the exhaust stream. The flow rates may be regulated, for example, by adjustment of a regulating valve in the recycle stream.

In another aspect, this invention provides a coffee roasting system, the system comprising:

- a combustion chamber which includes a burner for combusting gases;
- a roasting chamber for roasting coffee beans, the roasting chamber being connected to the combustion chamber for receiving all combusted gases produced in the combustion chamber;
- flow splitting means for splitting exhaust gases received from the roasting chamber into a recycle stream and an exhaust stream, the recycle stream being returned to the combustion chamber;
- a secondary combustion chamber which includes a burner for combusting exhaust gases in the exhaust stream;
- compressor means for causing gas flow through the system; and
- control means for controlling the flow of exhaust gases in the recycle stream and the exhaust stream and for closing the recycle stream during quenching of the coffee beans.

BRIEF DESCRIPTION OF THE DRAWINGS

Embodiments of the invention are now described, by way of example only, with reference to the drawing which is a schematic flow diagram of a process for controlling the levels of pollution from a coffee roasting process.

DETAILED DESCRIPTION OF THE INVENTION

Figure 1:
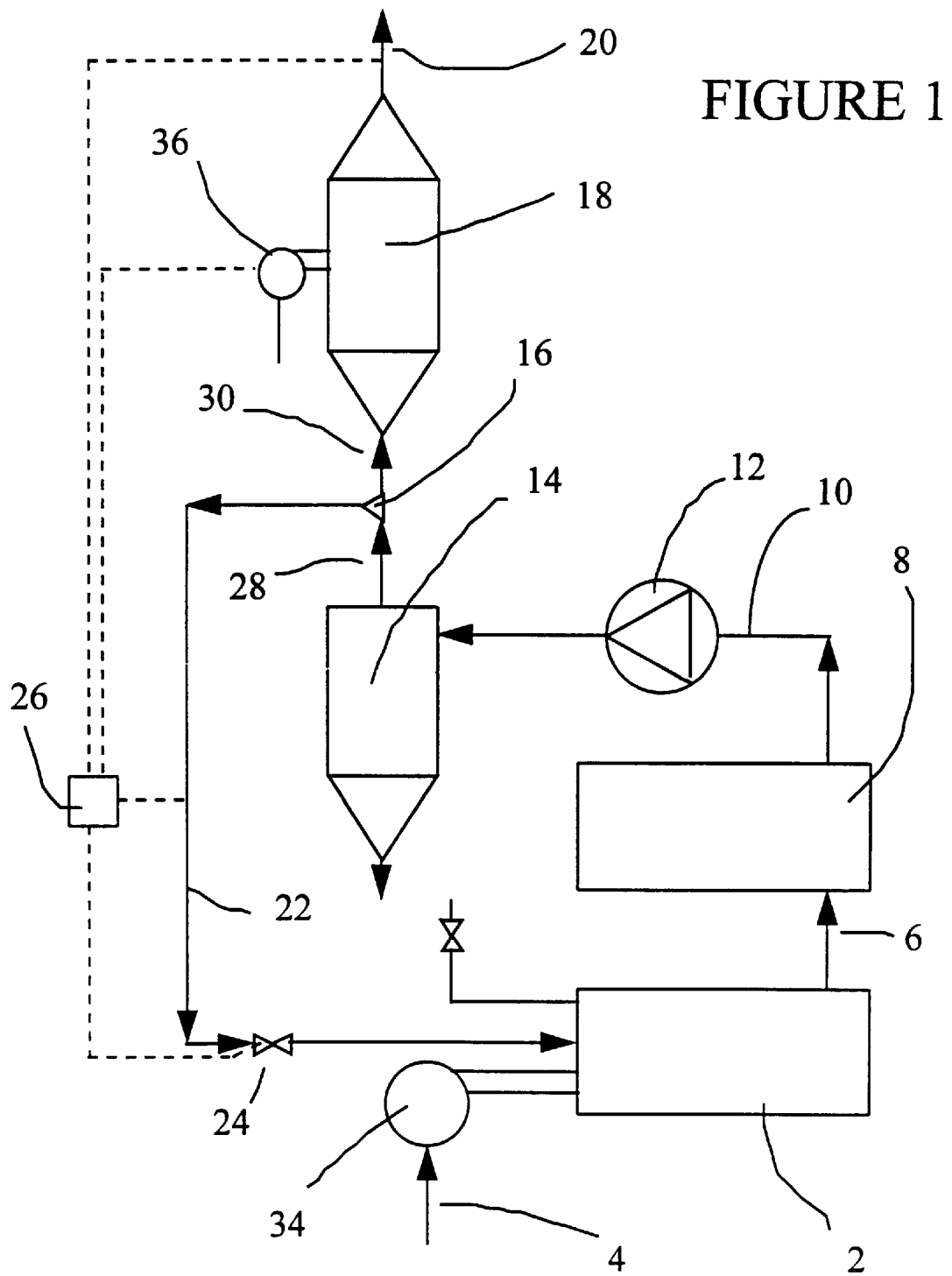

During the roasting of green coffee beans, fresh combustion gases 4 are drawn into a burner 34 and combusted in a combustion chamber 2 of a coffee roaster in a conventional manner. Recycled exhaust gases in a recycle stream 22 are also introduced into the combustion chamber 2 in a manner described below. The temperature in the combustion chamber 2 is a temperature suitable for producing gases for roasting coffee beans; for example from about 220° C. to about 600° C. Usually the temperature is in the region of about 400° C. to about 500° C.

The combusted gases 6 leaving the combustion chamber 2 are all directed to a roasting chamber 8 which, in use, contains green coffee beans to be roasted. Because the combusted gases 6 are at a temperature of about 220° C. to about 600° C., they cause the green coffee beans to be roasted.

The exhaust gases 10 from the roasting chamber 8 are compressed in a compressor 12 and are directed to a cyclone separator 14. Entrained solid particles in the exhaust gases 10 are removed from the bottom of the cyclone separator 14. The gases 28 leaving the top of the cyclone separator 14 are directed to a flow splitter 16 for splitting the gases 28 into the recycle stream 22 and an exhaust stream 30. The flow splitter 16 is conveniently a Y or T junction. The exhaust gases in the recycle stream 22 are returned to the combustion chamber 2. A regulating valve 24 regulates the flow of the exhaust gases in the recycle stream 22 and hence the split between the recycle stream 22 and the exhaust stream 30.

Clearly, the regulating valve 24 need not be positioned in the recycle stream 22; it may be positioned in the exhaust stream 30. Also, instead of using a simple flow splitter 16 and a regulation valve 24, the flow splitter 16 may include flow regulation means.

The exhaust gases in the exhaust stream 30 are directed to a secondary combustion chamber 18 in which they are further combusted; for example by means of a suitable burner 36. The temperature in the secondary combustion chamber 18 may conveniently be in the range of about 200° C. to about 350° C. The gases 20 leaving the secondary combustion chamber 18 are vented; for example through a chimney (not shown).

If desired, a catalytic converter (not shown) may be connected after the secondary combustion chamber 18. Since the gases 20 leaving the secondary combustion chamber 18 are usually at a temperature not exceeding about 350° C., a catalytic converter (not shown) may be readily connected after the secondary combustion chamber 18. If desired, a filter (for example a self-cleaning filter) may be positioned prior to the catalytic converter.

For quenching of the roasted beans, the regulating valve 24 is shut, preventing the flow of the exhaust gases in the recycle stream 22 into the combustion chamber 2. A quenching fluid is simultaneously sprayed on the roasted beans in the roasting chamber 8 to rapidly lower their temperature to below roasting temperatures. All gases given off during this stage pass through the compressor 12 and the cyclone separator 14 as described above. However, since the regulating valve 24 is shut, the gases 28 leaving the cyclone separator 14 are all directed through the flow splitter 16 to the secondary combustion chamber 18.

The entire system is controlled and regulated automatically by means of a controller 26. The controller 26 monitors the temperature and flow rate of the gases 20 leaving the secondary combustion chamber 18 and the temperature and flow rate of the exhaust gases in the recycle stream 22. From these parameters the controller 26 is able to determine the volumetric flow rate split between the recycle stream 22 and the exhaust stream 30. If the volumetric flow rate split deviates from a desired split, the controller 26 appropriately regulates the regulating valve 24 to obtain the desired split. Clearly, the same result may be achieved by having the controller 26 monitor other parameters; such as the flow rate in the exhaust stream 30 for example. Once the coffee beans are to be quenched, the controller 26 shuts the regulating valve 24; re-opening it upon start-up of the next roasting cycle.

Further, the controller 26 regulates the burner 36 in response to changes in the temperature of the gases 20 leaving the secondary combustion chamber 18 to obtain a constant temperature. This provides the advantage that exhaust gases at a constant, low temperature may be fed to a catalytic converter. Also, any legislative restrictions may be met. It is also possible for the controller 26 to regulate the burner 34 in the combustion chamber 2 to achieve the same effect.

Suitable controllers are commercially available; for example from the Allen-Bradley corporation.

Apart from emitting exhaust gases having relatively low temperatures, the process has the significant advantage that the exhaust gases are substantially transparent and have low levels of CO and NOx. For example, a typical analysis of exhaust gases vented by the process (without catalytic treatment) is as follows:

| | |
|---|---|
| Opacity | transparent |
| CO | 357 ppm |
| NOx | less than 50 mg/N m$^3$ |
| Temperature | about 240° C. |

Further, the energy consumption in the process is much lower than the conventional processes in which not all combusted gas is directed into the roasting chamber 8.

The controller 26 may also be used to ensure the safety of the system. For example, if the temperature of the exhaust gases in the recycle stream were to become higher than a safe maximum, an unacceptable fire risk may arise. If this should occur, the controller 26 may shut the regulation valve 24 and stop the burners.

As in the installation elements are introduced into the outlet for the fumes, which can be obstructed, it is advisable to introduce a bursting disc.

The following example, which is in no way. restrictive, is given to describe the process of the invention.

EXAMPLE

A batch of 240 kg of green coffee beans, being a blend of robusta/Brazil/milds in proportions of 30/40/30% by weight, are placed in the roasting chamber of a coffee roaster. The burner of the combustion chamber is fired up and all the exhaust gases from the combustion chamber are directed into the roasting chamber. The temperature of the gases entering the roasting chamber is 450° C. while the temperature of the exhaust gases leaving the rotary chamber is about 150° C., the coffee beans reaching a temperature of 210° C.

The exhaust gases from the roasting chamber are compressed and directed through a cyclone separator. The gases leaving the cyclone separator are divided in a flow splitter into a recycle stream comprising 70% of the gases and an exhaust stream comprising 30% of the gases. The split is controlled automatically by a control system which regulates a regulating valve in the recycle stream. The exhaust stream is directed to a secondary combustion chamber in which the gas is further combusted at about 350° C. using a secondary burner which is supplied with fuel and fresh air.

The exhaust gases from the secondary combustion chamber are at a temperature of 301° C. and are vented to the atmosphere. These gases contain the following contaminants:

| | |
|---|---|
| solid particles | undetectable |
| CO | 394 mg/N m$^3$ |
| NOx | 57 mg/N m$^3$ |
| TOC | undetectable |

The control system records the temperature of the vented gases discharged and the temperature of the recycled exhaust gases.

After about 14 minutes, the control system shuts the regulating valve and the recycle of gases to the combustion chamber is terminated. Also about 30 litres of water is sprayed inside the roasting chamber to quench the roasting process. Since the regulating valve is closed, all exhaust gases leaving the roasting chamber are directed to the secondary combustion chamber where they are combusted. The temperature of the exhaust gases from the secondary combustion chamber remains at about 301° C.

205 kg of roasted coffee beans are obtained.

What is claimed is :

1. A process for operating a coffee roaster to obtain reduced levels of pollutants in exhaust gases vented from the coffee roaster, the process comprising:

combusting gases in a combustion chamber and directing all of the combusted gases into a roasting chamber for roasting of coffee beans in the roasting chamber;

extracting exhaust gas from the roasting chamber and separating the exhaust gases into a recycle stream and an exhaust stream, the recycle stream comprising the majority of the exhaust gases and being returned to the combustion chamber; and subjecting the exhaust stream to secondary combustion prior to venting the exhaust stream; the secondary exhaust combustion taking place at a temperature in the range of about 200° C. to about 350° C.

2. A process according to claim 1 in which the recycle stream comprises about 60% to about 80% by volume of the exhaust gases extracted from roasting chamber.

3. A process according to claim 1 in which, upon termination of the roasting by quenching of the coffee beans. the recycle stream is closed and all exhaust gases extracted from the roasting chamber are directed to the exhaust stream.

4. A process according to claim 3 in which the process further comprises the step of removing entrained solid particles from the exhaust gases extracted from the roasting chamber prior to splitting of the exhaust gases into the recycle and exhaust streams.

5. A process according to claim 1 further comprising subjecting the exhaust gases in the exhaust stream to catalytic treatment to reduce CO levels after the secondary combustion.

6. A process for operating a coffee roaster to obtain reduced levels of pollutants in exhaust gases vented from the coffee roaster, the process comprising:

combusting gases in a combustion chamber and directing all of the combusted gases into a roasting chamber for roasting of coffee beans in the roasting chamber;

extracting exhaust gas from the roasting chamber;

separating the exhaust gases into a recycle stream and an exhaust stream, the recycle stream comprising the majority of the exhaust gases and being returned to the combustion chamber;

cortrolling the separation of the exhaust gases into the recycle stream and the exhaust stream to provide a constant volumetric flow rate split; and subjecting the exhaust stream to secondary combustion prior to venting the exhaust stream; the secondary exhaust combustion taking place at a temperature in the range of about 200° C. to about 350° C.

7. A process according to claim 6 in which the recycle stream comprises about 60% to about 80% by volume of the exhaust gases extracted from the roasting chamber.

8. A process according to claim 6 in which, upon termination of the roasting by qenching of the coffee beans, the recycle stream is closed and all exhaust gases extracted from the roasting chamber are directed to the exhaust stream.

9. A process according to claim 8 in which the process further comprises the step of removing entrained solid particles from the exhaust gases extracted from the roasting chamber prior to splitting of the exhaust gases into the recycle and exhaust streams.

10. A process according to claim 6 further comprising subjecting the exhaust gases in the exhaust stream to catalytic treatment to reduce CO levels after the secondary combustion.

* * * * *